(12) United States Patent
Maruyama et al.

(10) Patent No.: US 7,285,360 B2
(45) Date of Patent: Oct. 23, 2007

(54) POLYMER GEL ELECTROLYTE COMPOSITION AND METHOD OF PRODUCING THE SAME

(75) Inventors: Kunio Maruyama, Okayama (JP); Shinji Miyakawa, Koganei (JP); Shuichiro Yamaguchi, Hiratsuka (JP); Noboru Oyama, Musashino (JP)

(73) Assignees: Shirouma Science Co., Ltd., Toyama (JP); Fuji Jukogyo Kabushiki Kaisya, Tokyo (JP); Mitsui & Co., Ltd., Tokyo (JP); Noboru Oyama, Tokyo (JP)

( * ) Notice: Subject to any disclaimer, the term of this patent is extended or adjusted under 35 U.S.C. 154(b) by 474 days.

(21) Appl. No.: 10/828,468

(22) Filed: Apr. 19, 2004

(65) Prior Publication Data

US 2004/0197662 A1 Oct. 7, 2004

Related U.S. Application Data

(63) Continuation of application No. PCT/JP02/10746, filed on Oct. 16, 2002.

(30) Foreign Application Priority Data

Oct. 19, 2001 (JP) .............................. 2001-322319

(51) Int. Cl.
*H01M 6/14* (2006.01)
(52) U.S. Cl. ...................... 429/303; 429/300; 429/309; 429/317; 252/62.2
(58) Field of Classification Search ................ 429/303, 429/300, 309, 317; 252/62.2
See application file for complete search history.

(56) References Cited

U.S. PATENT DOCUMENTS 5,270,137 A * 12/1993 Kubota ....................... 429/249

FOREIGN PATENT DOCUMENTS

| EP | 1 113 035 | * 7/2001 |
|----|-----------|----------|
| JP | 2034661 | 2/1990 |
| JP | 3139552 | 6/1991 |
| JP | 5067475 | 3/1993 |
| JP | 5120912 | 5/1993 |
| JP | 2000319531 | 11/2000 |
| JP | 2002008726 | 1/2002 |

OTHER PUBLICATIONS

International Search Report dated Feb. 12, 2003 for International Application No. PCT/JP02/10746 (Exhibit 7).
International Preliminary Examination Report dated Jun. 16, 2003 for International Application No. PCT/JP02/10746 (Exhibit 8).
English-language translation of an International Preliminary Examination Report dated Jun. 16, 2003 in connection with International Application No. PCT/JP02/10746.

* cited by examiner

*Primary Examiner*—Laura Weiner
(74) *Attorney, Agent, or Firm*—John P. White; Cooper & Dunham LLP

(57) ABSTRACT

A polymer gel electrolyte composition includes a crosslinked polymer network matrix having a three-dimensional crosslinked structure that includes a solution of an electrolyte in a non-aqueous solvent, and a non-crosslinked polymer included within the crosslinked polymer network matrix. The non-crosslinked polymer includes (a) an ethylene unit and/or propylene unit, and (b) an unsaturated carboxylic acid unit having a carboxyl group esterified by a polyalkylene glycol having one terminal hydroxyl group protected.

9 Claims, 3 Drawing Sheets

POLYMER GEL ELECTROLYTE COMPOSITION AND METHOD OF PRODUCING THE SAME

CROSS-REFERENCE TO RELATED APPLICATIONS

This application is a continuation of PCT International Application No. PCT/JP02/10746, filed Oct. 16, 2002, designating the United States of America claiming priority of Japanese Patent Application No. 2001-322319 filed Oct. 19, 2001, the entire contents of which are hereby incorporated herein by reference.

BACKGROUND OF THE INVENTION

1. Field of the Invention

The present invention relates to a polymer gel electrolyte composition and a method of producing the same. More specifically, the present invention relates to a polymer gel electrolyte composition constituted by a crosslinked polymer network matrix of a three-dimensional crosslinked structure, which contains an electrolyte solution, and a non-crosslinked polymer contained in the matrix, and a method of producing the same.

2. Description of the Related Art

Electrochemical devices such as lithium ion secondary batteries, electrochromic devices, wet photovoltaic cells, capacitors, electric double-layer capacitors and sensors require an electrolyte to make them function. However, when the electrolyte is liquid, the electrolyte liquid must be sealed tightly to prevent troubles due to leakage of the liquid or short-circuiting, or requires a strong casing to prevent accidents due to shock, making it very difficult to reduce the weight or thickness of the electrochemical device. Then, there have been a number of attempts made to solidify the electrolyte solution. For example, an all-solid state type polymer battery using a solid electrolyte has been proposed (See, for example, Electrochimica Acta, 40 (13-14), 2177, 1995.) However, using solid electrolytes, it is difficult to obtain a device that has a practical performance at room temperature or less because of the poor ion conductivity of the solid-state materials.

Then, a battery that uses a so-called gel-type polymer electrolyte, which can prevent the leakage of the electrolyte solution and improve the ion conductivity, by using a gel obtained by swelling a polymer film with an electrolyte solution, has been developed and is widely used in cell phones, personal computers, etc. (See, for example, U.S. Pat. No. 5,418,091, and "Electrochemistry" 53(8), 619 (1985).) Up to now, as such a gel-type polymer electrolyte, a polymer gel electrolyte prepared using a polyacrylonitrile (PAN)-based polymer (Jpn. Pat. Appln. KOKAI Publication No. 4-306506 and Jpn. Pat. Appln. KOKAI Publication No. 7-54271), a polyethylene oxide (PEO)-based polymer (Jpn. Pat. Appln. KOKAI Publication No. 62-285954 and Jpn. Pat. Appln. KOKAI Publication No. 6-68906), or a polymethyl methacrylate (PMMA)-based polymer has been mainly developed. Further, it has been proposed that a polyvinylidene fluoride (PVDF) film is utilized for the gel electrolyte (See, for example, U.S. Pat. No. 5,418,091).

However, all of these polymer gel electrolytes are still not satisfactory in terms of heat resisting property and ion conductivity. Further, those which contain a large amount of halogen element, such as PVDF, may raise an environmental problem caused by generation of hydrogen fluoride or the like when the battery is disposed of by incineration.

In order to increase the energy density of the battery, for example, a thinner and smaller battery needs to be developed. In such a case, it is essential to develop a novel high-performance material that can achieve this object, and a new technology that can efficiently produce the material. For example, in order to charge and discharge a battery at a high speed, it is necessary to have a film-shaped gel electrolyte that has a high ion conductivity and that can be processed thinner. Further, in order to prevent leakage of the electrolyte solution, it is essential to have a high heat-resistant gel film that is not liquefied but is able to maintain its shape even at a high temperature. Furthermore, in light-related devices, it is essential that the electrolytic film have a transparency.

Thus, an object of the present invention is to provide a polymer gel electrolyte composition having a high ion conductivity, an excellent thermostability and a transparency, and a method of producing such a composition.

BRIEF SUMMARY OF THE INVENTION

The inventors of the present invention have carried out intensive studies in an attempt to achieve the above-described object, and found that a polymer gel electrolyte composition having an excellent ion conductivity and an excellent heat resistant property can be obtained with by constructing a gel structure which is so-called semi-IPN (Semi-Interpenetrating Polymer Network) by interlacing predetermined non-crosslinked polymers with a network having a three-dimensional structure made from crosslinkable monomers. The present invention is based on these findings.

Thus, according to a first aspect of the present invention, there is provided a polymer gel electrolyte composition comprising a crosslinked polymer network matrix having a three-dimensional crosslinked structure containing a solution of an electrolyte in a non-aqueous solvent, and a non-crosslinked polymer included in the crosslinked polymer network matrix, wherein the non-crosslinked polymer comprises (a) an ethylene unit and/or propylene unit; and (b) an unsaturated carboxylic acid unit having a carboxyl group esterified by a polyalkylene glycol having one terminal hydroxyl group protected.

According to a second aspect of the present invention, there is provided a method of producing a polymer gel electrolyte composition, comprising subjecting a reaction mixture comprising a solution of an electrolyte in a non-aqueous solvent, which dissolves a non-crosslinked polymer comprising (a) an ethylene unit and/or propylene unit and (b) an unsaturated carboxylic acid unit having a carboxyl group esterified by a polyalkylene glycol having one terminal hydroxyl group protected, and which is added with a crosslinkable monomer, to a reaction condition under which the crosslinkable monomer is crosslinkingly polymerized.

According to a third aspect of the present invention, there is provided a method of producing a polymer gel electrolyte composition, comprising applying a reaction mixture comprising a solution of an electrolyte in a non-aqueous solvent, which dissolves a non-crosslinked polymer comprising (a) an ethylene unit and/or propylene unit and (b) an unsaturated carboxylic acid unit having a carboxyl group esterified by a polyalkylene glycol having one terminal hydroxyl group protected, and which is added with a crosslinkable monomer, to a substrate; and subjecting the crosslinkable monomer to a reaction condition under which the crosslinkable monomer is crosslinkingly polymerized, thereby producing a polymer gel electrolyte composition integrated with the substrate.

Further, according to the present invention, there is provided an electrochemical device which has a polymer gel electrolyte composition of the present invention.

In the present invention, needless to say, the ethylene unit is a (repeating) unit derived from an ethylene monomer, the propylene unit is a (repeating) unit derived from a propylene monomer, and the unsaturated carboxylic acid unit is a (repeating) unit derived from an unsaturated carboxylic acid monomer.

DETAILED DESCRIPTION OF THE INVENTION

Figure 1:
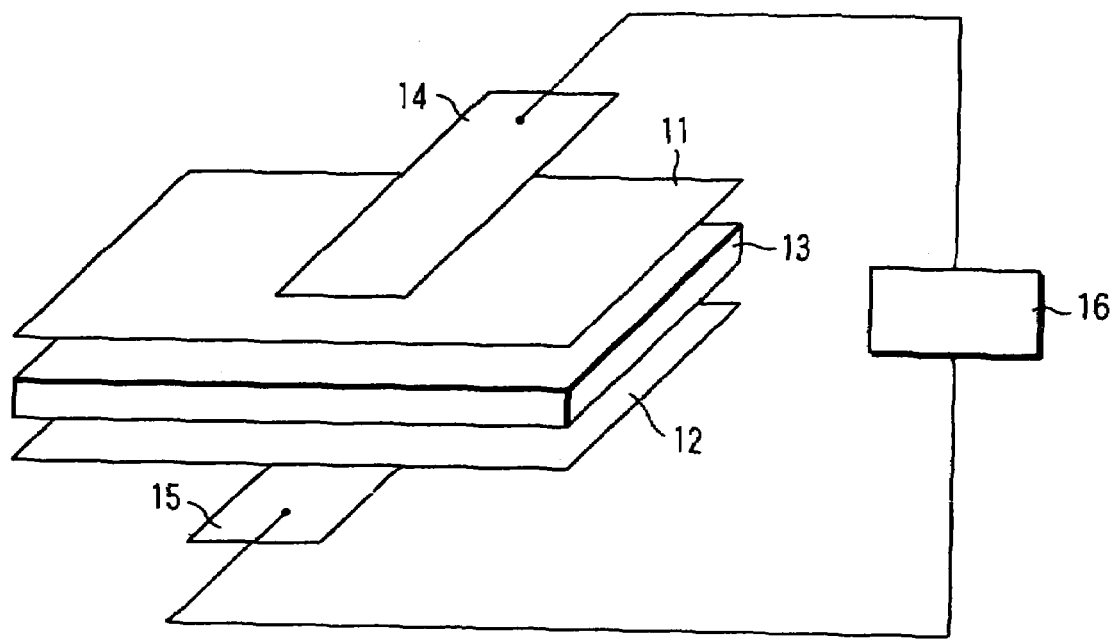
FIG. 1 is a developed perspective view showing a measurement cell for measuring charge/discharge properties of a lithium secondary battery.

The present invention will now be described in more detail.

The polymer gel electrolyte composition of the present invention includes a crosslinked polymer network matrix having a three-dimensional crosslinked structure containing a solution of an electrolyte in a non-aqueous solvent, and a non-crosslinked polymer included in the matrix.

In the present invention, the non-crosslinked polymer contains (a) an ethylene unit and/or propylene unit; and (b) an unsaturated carboxylic acid unit having a carboxyl group esterified by a polyalkylene glycol having one terminal hydroxyl group protected.

The unsaturated carboxylic acid that provides the unit (b) in the non-crosslinked polymer includes a carboxylic acid (monocarboxylic acid, dicarboxylic acid, etc.) having one unsaturated bond in the molecule, such as acrylic acid, methacrylic acid, itaconic acid, itaconic anhydride, maleic acid, maleic anhydride, monomethylmaleic acid, monoethylmaleic acid, monomethylitaconic acid and monoethylitaconic acid, but should not be limited thereto as long as it can be copolymerized with ethylene and/or propylene. Those carboxylic acids can be used solely or in combination of two or more.

In the unit (b), a carboxyl group of the unsaturated carboxylic acid is esterified by a polyalkylene glycol whose one terminal hydroxyl group, out of the two terminal hydroxyl groups, is protected. Such a polyalkylene glycol can be expressed by the following formula (I):

Pr—(O—R—)$_n$—OH     (I)

where Pr represents a protecting group, R represents an alkylene group and n is an integer of 1 or more. Examples of the alkylene group include ethylene, propylene and a combination of these. n is, preferably, 1 to 50, and more preferably, 2 to 12. Examples of the polyalkylene glycol include a polyethylene glycol, a polypropylene glycol and a polyethylene/propylene glycol. One of the terminal hydroxyl groups of these polyalkylene glycol is protected by a technique known per se, such as etherification, esterification and urethanization.

In the non-crosslinked polymer, the composition ratio between the unit (a) and the unit (b) may vary depending on the required level of the thermostability, the ion conductivity or the like, of the target polymer gel electrolyte composition, and therefore it cannot be determined generally. However, the preferable range of the content of ethylene and/or propylene is about 50 to 95% by mole. If the content of ethylene and/or propylene is less than 50% by mole, the softening temperature of the resulting non-crosslinked polymer becomes low; it becomes gummy or pasty at room temperature, making it very difficult to handle. On the other hand, when the ethylene content exceeds 95% by mole, the solubility of the resulting non-crosslinked polymer in a non-aqueous solvent becomes poor, which makes it sometimes difficult to prepare a solution of the non-crosslinked polymer.

The non-crosslinked polymer may contain another copolymerizable monomer as a third component within such a range of amount that would not deteriorate the properties or handling ease. Examples of the third copolymerizable monomer include vinyl compounds such as vinyl acetate and vinyl butyrate; and (meth)acrylate compounds such as methyl acrylate, ethyl acrylate, propyl acrylate, butyl acrylate, methyl methacrylate, ethyl methacrylate, propyl methacrylate, butyl methacrylate. Further examples include vinyl compounds such as acrylonitrile, methacrylonitrile, acrylamide, methacrylamide and styrene. As long as it is copolymerizable, the monomer is not limited to these.

The non-crosslinked polymer obtained by copolymerizing also the third component has an improved solubility in a solvent for an electrolyte, that is, a non-aqueous solvent, and is improved in the properties in some cases. However, if the third component is present in too large an amount, the softening temperature of the resulting polymer is lowered in many cases. Therefore, it is usually preferable that the amount of the third component copolymerized be 30% by mole or less.

The molecular weight of the non-crosslinked polymer of the present invention is not particularly limited, but in general, it is, by weight-average, 2,000 to about 800,000. When the molecular weight is high, the content of the non-crosslinked polymer component in the polymer gel electrolyte composition can be reduced, which is preferable. However, in consideration of the facts that it is difficult to obtain a high molecular weight polymer, and that it is difficult to manufacture it by esterification, which will be later explained, the molecular weight is practically about 3,000 to 500,000, and more practically about 3,000 to 100,000. In these ranges of the molecular weight, the lower limit is more preferably 4,000. In the present invention, when preparing a polymer gel electrolyte composition, which will be described in detail below, two kinds of non-crosslinked polymers that have different molecular weights may be blended together and then dissolved into a non-aqueous solvent in order to prepare a non-crosslinked polymer solution having such a viscosity as to be easy to handle.

The non-crosslinked polymer of the present invention can be prepared reacting a copolymerized polymer (precursor polymer) which is obtained beforehand by copolymerizing ethylene and/or propylene, and the above-mentioned unsaturated carboxylic acid (or its anhydrate), optionally together with the above-mentioned third copolymerizable monomer, with the above-mentioned polyalkylene glycol whose one terminal hydroxyl group is protected (one-terminal protected polyalkylene glycol), thereby esterifying a carboxyl group in the precursor polymer with the one-terminal protected polyalkylene glycol. It is necessary for the polyalkylene glycol used here to have one of the terminal hydroxyl groups protected as described above in order to prevent crosslinking between the precursor polymer chains.

The copolymerization reaction of ethylene and/or propylene with unsaturated carboxylic acid and the third copolymerizable monomer that may be added optionally is a very ordinary copolymerization reaction, and is well known to those skilled in the art. Further, the reaction between the obtained copolymerized polymer and the one-terminal protected polyalkylene glycol can be carried out by an ordinary esterifying method. For example, the copolymerized polymer and the one-terminal protected polyalkylene glycol can be reacted with each other in the presence of an acidic catalyst such as p-toluenesulfonic acid at a temperature of 80 to 160° C. and for 6 to 40 hours, for example.

It is preferable that the amount of unreacted (remaining) carboxylic acid in the non-crosslinked polymer of the present invention, which is prepared through the esterification, be as small as possible. If the amount of unreacted carboxylic acid in the non-crosslinked polymer, calculated in terms of acrylic acid, exceeds 5% of the total weight of the non-crosslinked polymer, the ion conductivity is lowered and the change of the properties with time becomes remarkable. As a result, there is a tendency that it becomes difficult to obtain a polymer gel electrolyte composition having an excellent charge/discharge property. Then, in order to increase the esterification degree to reduce the amount of the unreacted carboxylic acid in the esterification reaction, it is preferable that the one-terminal protected polyalkylene glycol be used in an equimolar amount or more with respect to the carboxylic acid in the precursor polymer, and the reaction be carries out for a relatively long time. It is preferable that the amount of unreacted one-terminal protected polyalkylene glycol remaining after the reaction be as small as possible, and the content thereof in the obtained non-crosslinked polymer be 10% by weight or less. In the case where a non-crosslinked polymer containing more than 10% by weight of an unreacted one-terminal protected polyalkylene glycol compound remaining therein is used, the ion conductivity becomes low, the interface resistance between the gel electrolyte and the positive electrode material or negative electrode material becomes high, and the stability in the charge-discharge property is deteriorated, resulting in that a good secondary battery cannot be manufactured in some cases. It should be noted that the unreacted one-terminal protected polyalkylene glycol can be removed by washing with water, or with an alcohol such as methanol, ethanol or propanol. To facilitate drying after the washing, it is preferable to use a low-boiling alcohol.

In the present invention, the amount of the unreacted (remaining) carboxylic acid in the non-crosslinked polymer is obtained by calculating the amount of —COOH from the hydrogen ion amount obtained by an alkali titration, and estimating the amount of the unreacted carboxylic acid as acrylic acid; it is calculated by the following equation:

Amount of unreacted carboxylic acid (%)=(amount of —COOH (mole)×72)/45 where "72" is the molecular weight of acrylic acid, and "45" is the molecular weight of —COOH.

In the polymer gel electrolyte composition of the present invention, the crosslinked polymer network matrix having a three-dimensional crosslinked structure is obtained by crosslinking polymerization of crosslinkable monomers. The crosslinkable monomers react with each other by means of, for example, heating, ultraviolet ray irradiation or electron beam irradiation into a polymer having a three-dimensional crosslinked structure. Examples of such a crosslinkable monomer include compounds containing, per molecule, two or more reactive functional groups such as vinyl group, epoxy group, amino group, amide group, imide group, hydroxyl group, methylol group, carboxylic acid group and isocyanate group. The two or more reactive functional groups contained in one molecule of the crosslinkable monomer may be of the same kind, or different kinds.

Specific examples of the crosslinkable monomer having two or more reactive functional groups per molecule include ethylene glycol diacrylate, ethylene glycol dimethacrylate, polyalkylene glycol diacrylate, polyalkylene glycol dimethacrylate, 1,4-butanediol diacrylate, 1,4-butanediol dimethacrylate, 1,6-hexanediol diacrylate, 1,6-hexanediol dimethacrylate, 1,9-diol diacrylate, 1,9-nonanediol dimethacrylate, divinylbenzene, glycerol diacrylate, glycerol tracrylate, glycerol trimethacrylate, glycerol diglycidyl ether, trimethylolpropane trimethacrylate, pentaerythritol triacrylate, pentaerythritol tetracrylate, pentaerythritol hexacrylate, glycidyl acrylate, glycidyl methacrylate, pentaerythritol trimethacrylate, pentaerythritol tetramethacrylate, pentaerythritol hexamethacrylate, ethylene glycol diglycidyl ether, polyalkelene glycol diglycidyl ether, 1,6-hexanediol diglycidyl ether, N-methylolacrylamide, N-methylolmethacrylamide, 2-hydroxyethyl acrylate, 3-hydroxyethyl acrylate, 2-hydroxyethyl methacrylate, 3-hydroxyethyl methacrylate, 2-methacryloylethylisocyanate, hexamethylenediisocyanate, 2,4-toluenediisocyanate, 1,5-naphthalenediisocyanate, 4,4'-diphenyldiisocyanate, 3,3'-dimethoxy-4,4'-biphenyldiisocyanate, triphenylmethanetriisocyanate and trimethylolmelamine, but should not be limited thereto.

In the polymer gel electrolyte composition of the present invention, the electrolyte solution contained in the crosslinked polymer network matrix is a solution of an electrolyte dissolved in a non-aqueous solvent.

As the electrolyte for a lithium secondary battery use may be preferably made of lithium salts of inorganic compounds such as $LiClO_4$, $LiBF_4$, $LiPF_6$ and $LiAsF_6$, and organic fluorine lithium salts such as $CF_3SO_3Li$, $(CF_3SO_2)_2NLi$ and $(CF_3SO_2)_3CLi$. For a condenser or capacitor, use may be preferably made of quaternary ammonium salts such as tetramethylammonium tetrafluoroborate, tetraethylammonium hexafluorophosphate, tetrabutylammonium tetrafluoroborate and monomethyltriethylammonium tetrafluoroborate. However, the invention is not limited to these examples. For an electrolytic capacitor, ammonium salt of dicarboxylic acid is used in some cases.

The non-aqueous solvent is a solvent that can dissolve not only the electrolyte, but also the non-crosslinked polymer and crosslinkable monomer mentioned above. Examples of the non-aqueous solvent are carbonate esters such as ethylene carbonate (EC), propylene carbonate (PC), butylene carbonate (BC), diethyl carbonate (DEC), dimethyl carbonate (DMC) and methylethyl carbonate (nMEC). In some cases, one or more ether compounds such as ethylene glycol, propylene glycol, methyl cellosolve and ethyl cellosolve are recommended, or one or more γ-butyrolactone (γ-BL), sulfolane, adiponitrile, glutaronitrile, N-methylpyrrolidone and trimethyl phosphate are recommended. In the case of a condenser or capacitor, an ether compound such as ethylene glycol, propylene glycol, methyl cellosolve or ethyl cellosolve is used solely or in combination with another solvent in some cases. It is preferable that the water content of the non-aqueous solvent be 1,000 ppm or less.

The concentration of the electrolyte in the non-aqueous solvent is determined in consideration of the type of the electrolyte and the target level of the ion conductivity, but it is in a range of about 0.1 to 3 moles/liter, preferably, 0.5 to 2 moles/liter.

The polymer gel electrolyte composition of the present invention can be prepared by preparing a solution by adding the crosslinkable monomer to the solution of the electrolyte in the non-aqueous solvent, in which the above-described non-crosslinked polymer has been dissolved, and subjecting the mixture to a reaction condition under which the crosslinkable monomer is crosslinkingly polymerized. It should be noted that in order to prevent the adverse effect due to the absorption of moisture in the atmosphere, the preparation of the polymer gel electrolyte composition is preferably carried out with the outside air shut off, or in a dry atmosphere having a dew point of −40° C. or less.

For the crosslinking polymerization of the crosslinkable monomer, for example, heat polymerization method, ultraviolet ray irradiation polymerization method or electron beam irradiation polymerization method may be used. In the polymerization, it is preferable that a polymerization catalyst or reaction promoter be selected such that the gel composition after the polymerization reaction does not contain metals other than lithium, a large amount of inorganic ions and a large amount of catalyst residues. In view of this, it is recommended to use a heat polymerization method using a polymerization catalyst which does not contain metal ions or inorganic salts, such as organic peroxide like benzoyl peroxide or azobis-based catalyst such as azobisisobutyronitirle, or electron beam irradiation or ultraviolet ray irradiation for the polymerization. The amount of the polymerization catalyst used varies depending on the type of the catalyst and the target molecular weight, and cannot be defined generally, but its preferable range is 0.01 to 5% by weight with respect to the total amount of the crosslinkable monomers.

In the present invention, it is most preferable that the weight ratio of non-crosslinked polymer: electrolyte solution: crosslinkable monomer should be 1:3 or more: 0.1-2. In the case where the amount of the non-aqueous solvent is small, such as the weight ratio between the non-crosslinked polymer and the electrolyte solution of 1: less than 3, the amount of the non-crosslinked polymer in the resulting polymer gel electrolytic compound becomes large, resulting in embrittlement of the gel composition and deterioration of the flexibility. Therefore, a thin-film gelled matter becomes easily breakable, sometimes making it impossible to obtain a stable film. On the other hand, in the case where the ratio of the crosslinkable monomer is less than 0.1 parts by weight with respect to 1 part by weight of the non-crosslinked polymer, a polymer gel electrolyte composition having a high heat stability cannot be obtained in some cases. When the ratio of the crosslinkable monomer exceeds 2 parts by weight with respect to 1 part by weight of the non-crosslinked polymer, the resulting gel composition is embrittled, and a practical thin-film gel composition with flexibility cannot be obtained in some cases. The suitable range of the weight ratio between the non-crosslinked polymer and the electrolyte solution largely varies depending on the molecular weight of the non-crosslinked polymer, and therefore it cannot be determined generally. However, for a molecular weight of about 5,000, a ratio of 1:3-1:20 is preferable, and for a molecular weight of about 100,000, a ratio of 1:5-1:50 is suitable.

The polymer gel electrolyte composition of the present invention thus prepared has a gel structure that is a semi-interpenetrating polymer network type gel, a so-called semi-IPN-type gel, in which the non-crosslinking having no chemical bonds (crosslinked structure) between the molecules is entangled in the network having a three-dimensional structure constructed from the crosslinkable monomers. (See "Shin Koubunnshi Jikkenngaku" (New Study on High Polymer Experiments), Vol. 4, Synthesis and Reaction of High Polymers (3), pages 193 to 195, Edited by Society of Polymer Science, Japan, Published by Kyohritu Shuppan (1996).)

Because of its semi-IPN-type gel structure described above, the polymer gel electrolyte composition of the present invention has a far more excellent thermostability as compared to that of a so-called physical gel obtained by dissolving a polymer in a solvent, followed by cooling, and it does not reconstruct a solution state even if it is heated to 80° C. or higher, or does not change in its shape. Therefore, when it is placed under the use conditions of an ordinary secondary battery, the electrolyte solution does not leak at all. The heat stability of the gel can be varied in a wide range depending on the content of the non-crosslinked polymer in the polymer gel electrolyte composition and the amount of the crosslinkable monomer added. For practical use, it suffices if the gel solid has such a heat stability that it can maintain its shape even when heated to 80° C.

According to the present invention, the polymer gel electrolyte composition can be prepared in a state (composite state) in which it is integrated with a substrate, by applying, to the substrate, a reaction mixture prepared by adding the crosslinkable monomer to a solution of the electrolyte in the non-aqueous solvent in which the above-described non-crosslinked polymer has been dissolved, and subjecting the reaction mixture to such a reaction condition under which the crosslinkable monomer is crosslinkingly polymerized as described above. This method can form the composite simultaneously with the formation of the polymer gel electrolyte composition (crosslinking polymerization of the crosslinkable monomers) and is therefore very advantageous industrially.

As the substrate mentioned above, a porous thin film such as a non-woven fabric or a porous film can be used. In such a case, it is preferable, in order to impregnate the reaction mixture into the porous thin film uniformly and sufficiently, to use, for example, a so-called reduced-pressure impregnation method in which the porous thin film is deaerated under a reduced pressure and the mixture is then impregnated, a method in which deaeration and impregnation are carried out continuously at the same time using a vacuum impregnation device, or a method in which deaeration/impregnation and pressurization are carried out several times to effect uniform impregnation. By using these methods, a more uniform polymer gel electrolyte composition integrated with the porous thin film can be obtained.

Alternatively, as the substrate, a sheet substrate such as a sheet of positive electrode material or negative electrode material can be used. In such a case, the reaction mixture is applied onto the surface of the sheet of positive electrode material or negative electrode material to a predetermined thickness (for example, 0.1 µm to 0.5 mm), and then the crosslinking polymerization reaction of the crosslinkable monomers is carried out. In this manner, a composite can be obtained in which the thin film of the polymer gel electrolyte composition of the present invention is firmly attached to and integrated with the sheet substrate.

Further, when the crosslinking polymerization of the crosslinkable monomers is carried out while the porous thin film impregnated with the reaction mixture as above is kept in contact with the sheet substrate, the reaction mixture is converted into the polymer gel composition within the porous thin film, and a composite can be obtained in which the porous thin film and sheet substrate are firmly bonded together.

Further, a secondary battery can be fabricated very easily by preparing a battery structure beforehand by combining a positive electrode material sheet, a separator made of a porous thin film, and a negative electrode material sheet together. Then, the porous thin film (separator) is impregnated with the above-described reaction mixture, and the crosslinkable monomers are crosslinkingly polymerized.

The polymer gel electrolyte composition of the present invention exhibits such a high ion conductivity and stable charge-discharge properties that cannot be achieved by the conventional gel electrolyte. Further, the polymer gel electrolyte composition of the present invention is flexible and homogenous, easy to handle and has an excellent adhesivity.

Further, the polymer gel electrolyte composition of the present invention is transparent and light-transmissible. Therefore, the polymer gel electrolyte composition of the present invention can be suitably used as the electrolyte of not only a battery such as a lithium ion secondary battery, but also of a capacitor, an electric double layer capacitor, a wet photovoltaic battery, a sensor, and a display device such as an electrochromic device. It should be noted that in terms of the transparency, a preferable unit (a) is the ethylene unit.

The present invention will now be described in more detail by presenting typical Examples and Comparative Examples; however the invention is not limited to those examples. Note that "parts" and "%" used in the Examples and Comparative Examples are by weight, unless otherwise indicated.

First, the evaluation methods employed in the following Examples and Comparative Examples will be described.

<Evaluation of Heat Resistance of Gel Film>

A gel film having a square shape of about 2.5×2.5 cm and a thickness of 300 μm is put in a glass laboratory dish, and a lid is placed thereon. Then, it is heated in a hot-air circulation type thermostatic chamber whose temperature is set to 80° C. After one hour, the gel film is taken out, and the change in the shape is observed. The level of the thermostability is evaluated by the following three stages.

GOOD: No change in the shape of gel film is observed before and after heating. (Note that slight shrinkage of the film due to the heating is not counted in the evaluation.)

FAIR: Part of the gel film is melted or slight phase separation into gel and solution due to the heating is observed.

NO GOOD: About a half or more of the gel film is melted or significant phase separation into gel and solution due to the heating is observed.

<Evaluation of Flexibility of Gel Film>

A gel film having a thickness of 300 μm is placed on an aluminum foil having a thickness of 30 μm, and the gel film is bent together with the aluminum foil to an angle of 90 degrees, and then straightened back to the original shape. Then, the bent portion of the film is observed as to whether or not there is a crack created there, and the flexibility is evaluated by the following three stages.

GOOD: No crack is produced and the crease is not substantially arisen.

FAIR: No crack is produced but the crease is clearly marked.

NO GOOD: A crack is produced.

<Evaluation of Electrochemical Property>

A TEFLON spacer having a square shape of 3.5×3.5 cm and a thickness of 300 μm (and having a hole of 2×2 cm made at its center) is placed on a lithium metal foil having a square shape of 3×3 cm and a thickness of 100 μm. Then, the gel film having a thickness of 300 μm is set in the center hole, and another metallic lithium foil similar to the above is laid upon it. On both sides, stainless (SUS304) foils having a thickness of 100 μm are respectively attached as current collectors. On both sides of the obtained structure, glass plates having a thickness of 2 mm are attached and they are fixed together with clips. Thus, a cell for evaluation is assembled, and lead lines are connected thereto to measure its electrochemical properties. The assembly of the cell for evaluation is carried out in a glove box having an argon atmosphere.

The conductivity of the gel film and its resistance value are evaluated with use of an AC impedance measuring device, Model 1287+1250 Type of Solartron Co., while applying an alternating voltage of 5 mV. The measurement is carried out at 20° C., and the alternating current impedance response is measured in a frequency region of 0.1 Hz to 65 kHz. From the results obtained, the values of the bulk resistance at the interface between the lithium foil and gel film, and conductivity are obtained.

Further, at 20° C., a cyclic voltammetry measurement of an inversion voltage of ±0.5V at a potential sweep rate of 10 mV/sec is carried out and the alternating current impedance is measured after every 5 cycles of the voltage inversion.

EXAMPLES 1 TO 4 AND COMPARATIVE EXAMPLE 1

In conformity to the method reported by A. Hallden et al. in J. Appl. Poly. Sci., vol. 75, 316-326 (2000), a one-terminal methylated polyethylene glycol (polymerization degree n=9) was reacted with an ethylene/acrylic acid copolymer having a molar ratio between ethylene and acrylic acid of 90:10 and having a weight-average molecular weight of about 50,000 to esterify the acrylic acid moieties of the ethylene/acrylic acid copolymer. Subsequently, in order to remove the unreacted one-terminal methylated polyethylene glycol, the obtained polymer was extracted 5 times with ethanol at 30° C. to give a non-crosslinked polymer (non-crosslinked polymer PA). After the extraction with ethanol, the non-crosslinked polymer PA was dried at 50° C. for 5 hours under a reduced pressure. After the drying, the unreacted acrylic acid content of the non-crosslinked polymer PA was 3%, and the unreacted one-terminal methylated polyethylene glycol content was 3%.

7.5 g of the dried non-crosslinked polymer PA was added to 92.5 g of an electrolyte solution (electrolyte solution EA) prepared by dissolving $LiBF_4$ as a supporting electrolyte at 1 molar concentration in a mixture solvent of ethylene carbonate and propylene carbonate at a volume ratio of 1:1, and then the mixture was stirred at 70° C. for an hour while heating to dissolve the polymer. Thus, the polymer solution (polymer solution SA) was prepared.

The polymer solution SA, a diacrylate of polyethylene glycol having a polymerization degree (n) of 9 (to be called crosslinkable monomer MA hereinafter) as a crosslinkable monomer, and benzyldimethylketal (BDK) were mixed together in amounts specified in TABLE 1, and 5 types of reaction mixtures were prepared (Examples 1 to 5).

With use of a hand coater (a manual coating device), a silicone rubber frame having a thickness of 300 μm and serving as a spacer is placed on a TEFLON sheet having a thickness of about 3 mm, and the reaction mixture was poured into the frame. Then, an ultraviolet ray having a peak at 360 nm was irradiated from above onto the reaction mixture coating having a thickness of 300 μm coated on the TEFLON sheet for 15 minutes, thereby effecting the crosslinking polymerization of the crosslinkable monomers. During this period, the UV ray intensity was measured with a UV ray illuminometer (Model UV-MO2-35 of Oak Seisakusho) to find that it was 10 mW/cm$^2$. In this manner, 5 types of film-shaped polymer gel electrolyte compositions (gel films) (Examples 1 to 5) were prepared.

In the meantime, as Comparative Example 1, 2 g of the non-crosslinked polymer PA and 8 g of the electrolyte solution EA were mixed, and they were heated to 100° C. to dissolve the polymer, which was then applied and shaped to have a thickness of 300 μm in the same manner as in Example 1. Then, the film was cooled down to the room temperature, thus preparing a gel film.

It should be noted that the preparations of the gel films of Examples 1 to 5 and Comparative Example 1 were all carried out in a dry room where the dew point was below −50° C.

These gel films were evaluated by the above-described evaluation methods in terms of the electrochemical properties (ion conductivity), thermostability and flexibility. The results were also shown in TABLE 1.

As is clear from the results shown in TABLE 1, the gel films of Examples 1 to 5 of the present invention were transparent gel films that did not exhibit any melting or phase separation even when heated to 80° C., but showed an excellent thermostability and a high lithium ion conductivity.

On the other hand, since the gel prepared in Comparative Example 1 was a physical gel that had not crosslinked structure, it was melted when heated to 80° C. and showed a very poor thermostability.

EXAMPLES 6 TO 15 AND COMPARATIVE EXAMPLES 2 TO 6

A dried non-crosslinked polymer PA was dissolved into an electrolyte solution EA to prepare a polymer solution having a non-crosslinked polymer PA concentration of 3 to 33% (non-crosslinked polymer PA/electrolyte solution EA=3/97 to 33/67 in weight ratio). As shown in TABLE 2, the polymer solution, crosslinkable monomer MA and BDK were mixed in various amounts to prepare a total of 15 types of reaction mixtures as Examples 6 to 15 and Comparative Examples 2 to 6. With each reaction mixture, a gel film was prepared as in Example 1, and the ion conductivity, thermostability and flexibility were evaluated similarly. The results are shown in TABLE 2.

As is clear from the results shown in TABLE 2, in Comparative Examples 2 and 3, the sample was in a state of solution even after the irradiation of UV ray, and therefore a test cell for evaluation could not be prepared by the method of Example 1. On the other hand, the gel films of Comparative Examples 4 and 5 were in a hard gel state, which had some thermo-stability, but were brittle and poorly flexible. In particular, the gel film of Comparative Example 5 was brittle and hard to handle, and therefore it was difficult to assemble a cell for evaluating its electrochemical properties.

As compared to these comparative examples, Examples 6 to 15 of the present invention had an appropriate flexibility and were easy to handle, and they also exhibited excellent ion conductivity and thermostability.

From these results, it is found that an appropriate ratio between the non-crosslinked polymer and crosslinkable monomer of the present invention is about 1/0.1 to 1/2, and the amount of the non-aqueous solvent should be at least three times of the weight of the non-crosslinked polymer.

TABLE 1

| | Non-crosslinked polymer solution SA (g) | Crosslinkable monomer MA (g) | BDK (g) | Ion Conductivity (mS/cm) | Thermostability | Flexibility |
|---|---|---|---|---|---|---|
| Ex. 1 | 10 | 0.25 | 0.01 | 3.5 | FAIR | GOOD |
| Ex. 2 | 10 | 0.5 | 0.02 | 3.2 | GOOD | GOOD |
| Ex. 3 | 10 | 0.75 | 0.03 | 3.1 | GOOD | GOOD |
| Ex. 4 | 10 | 1.0 | 0.04 | 2.8 | GOOD | GOOD |
| Ex. 5 | 10 | 1.5 | 0.06 | 2.3 | GOOD | FAIR |
| Com. Ex. 1 | 10 | None | None | 1.7 | NO GOOD | FAIR |

TABLE 2

| | Non-cross-linked Polymer PA (g) | Electrolyte solution EA (g) | Crosslinkable monomer MA (g) | Non-crosslinked polymer/crosslinkable monomer (weight ratio) | BDK (g) | Ion Conductivity (mS/cm) | Thermostability | Flexibility |
|---|---|---|---|---|---|---|---|---|
| Com. Ex. 2 | 3 | 97 | 0.2 | 1/0.07 | 0.01 | Immeasurable | NO GOOD | Solution state |
| Com. Ex. 3 | 5 | 95 | 0.2 | 1/0.04 | 0.01 | Immeasurable | NO GOOD | Solution state |

TABLE 2-continued

| | Non-cross-linked Polymer PA (g) | Electrolyte solution EA (g) | Crosslinkable monomer MA (g) | Non-crosslinked polymer/crosslinkable monomer (weight ratio) | BDK (g) | Ion Conductivity (mS/cm) | Thermostability | Flexibility |
|---|---|---|---|---|---|---|---|---|
| Ex. 6 | 5 | 95 | 0.5 | 1/0.1 | 0.02 | 3.2 | FAIR | GOOD |
| Ex. 7 | 5 | 95 | 5.0 | 1/1 | 0.10 | 3.0 | GOOD | GOOD |
| Ex. 8 | 5 | 95 | 10.0 | 1/2 | 0.20 | 2.8 | GOOD | GOOD |
| Ex. 9 | 7 | 93 | 3.5 | 1/0.5 | 0.10 | 3.1 | GOOD | GOOD |
| Ex. 10 | 7 | 93 | 7.0 | 1/1 | 0.20 | 2.9 | GOOD | GOOD |
| Ex. 11 | 10 | 90 | 2.5 | 1/0.4 | 0.10 | 3.2 | GOOD | GOOD |
| Ex. 12 | 10 | 90 | 5.0 | 1/0.5 | 0.20 | 2.7 | GOOD | GOOD |
| Ex. 13 | 15 | 85 | 5.0 | 1/0.33 | 0.20 | 2.5 | GOOD | GOOD |
| Ex. 14 | 20 | 80 | 2.5 | 1/0.125 | 0.12 | 1.8 | GOOD | FAIR |
| Ex. 15 | 25 | 75 | 2.5 | 1/0.1 | 0.12 | 1.2 | GOOD | FAIR |
| Com. Ex. 4 | 30 | 70 | 5.0 | 1/0.17 | 0.20 | 0.5 | GOOD | NO GOOD |
| Com. Ex. 5 | 30 | 70 | 10.0 | 1/0.33 | 0.40 | Immeasurable | GOOD | NO GOOD |

EXAMPLES 16 TO 18 AND COMPARATIVE EXAMPLES 6 AND 7

A one-terminal ethylated polyethylene glycol (polymerization degree n=6) was reacted at a temperature of 140° C. with an ethylene/acrylic acid copolymer having a molar ratio between ethylene and acrylic acid of 90:10 and having a weight-average molecular weight of about 70,000, effecting the esterification, while the esterification time was changed, i.e., 4, 8, 12, 16 or 24 hours, thus synthesizing 5 types of non-crosslinked polymers different in esterification degrees, that is, the amount of acrylic acid remaining. These non-crosslinked polymers were immersed in ethanol at 30° C. for 4 hours to extract the unreacted one-terminal ethylated polyethylene glycol. This extraction operation was repeated 7 times to adjust the content of the unreacted one-terminal ethylated polyethylene glycol to 1% or less. The amounts of acrylic acid remaining in the non-crosslinked polymers were 12.5%, 7.3%, 4.8%, 2.4% and 0.8%, respectively.

7.5 g of each non-crosslinked polymer was dissolved in 92.5 g of the electrolyte solution EA, and then 7.5 g of the crosslinkable monomer MA and 0.3 g of BDK were added, preparing a reaction mixture.

Using these reaction mixtures, gel films were prepared respectively as in Example 1, and their electrochemical properties (initial interface resistance, and ion conductivity) were evaluated. The results are shown in TABLE 3. The thermostability and flexibility of these gel films were evaluated as well, and the results showed that all of them were GOOD, presenting no problems in thermostability or flexibility. However, in Comparative Examples 6 and 7, where the content of acrylic acid was 12% and 7%, the gel films exhibited a low ion conductivity and a markedly high initial interface resistance between the metal lithium foil and the gel film, indicating that these films were not appropriate as a gel electrolyte. By contrast, in the case where the amount of acrylic acid is 5% or less, an excellent polymer gel electrolyte composition having a high ion conductivity and a low initial interface resistance was obtained.

TABLE 3

| | Content of Remaining Acrylic Acid (%) | Ion Conductivity mS/cm | Initial Interface Resistance Ω · cm |
|---|---|---|---|
| Com. Ex. 6 | 12.5 | 0.8 | 1200 |
| Com. Ex. 7 | 7.3 | 1.5 | 850 |
| Ex. 16 | 4.8 | 2.5 | 350 |
| Ex. 17 | 2.4 | 2.8 | 150 |
| Ex. 18 | 0.8 | 3.3 | 100 |

EXAMPLES 19 TO 21 AND COMPARATIVE EXAMPLE 8

A one-terminal ethylated polyethylene glycol (polymerization degree n=9) was reacted for 24 hours with an ethylene/methacrylic acid copolymer having a molar ratio between ethylene and methacrylic acid of 92:8 and having a weight-average molecular weight of about 50,000, effecting esterification, to give a non-crosslinked polymer containing 1.5% of unreacted methacrylic acid. After the esterification, the unreacted one-terminal ethylated polyethylene glycol (to be called unreacted matter hereinafter) was extracted with ethanol at 30° C., while the number of extraction carried out was changed for each example as 1, 3, 5 and 7 times. Thus, non-crosslinked polymers of 4 levels, that is, having 24%, 9%, 3% and 1% of unreacted matter, were obtained.

6 g of each non-crosslinked polymer mentioned above was dissolved in 94 g of the electrolyte solution EA, and 8 g of the crosslinkable monomer MA and 0.3 g of BDK were added, preparing a reaction mixture.

Using each reaction mixtures, gel films were prepared by the same method as that of Example 1, and they were evaluated similarly. The results are shown in TABLE 4. As can be seen from TABLE 4, those gel films that were obtained from the non-crosslinked polymers having 10% or less of unreacted matter had a high ion conductivity and a low resistance at the interface with the lithium metal foil, and therefore they are excellent polymer gel electrolytes.

TABLE 4

|  | Content of Unreacted Material (%) | Ion Conductivity mS/cm | Initial Interface Resistance Ω · cm |
|---|---|---|---|
| Com. Ex. 8 | 24 | 0.5 | 950 |
| Ex. 19 | 9 | 2.2 | 350 |
| Ex. 20 | 3 | 2.9 | 180 |
| Ex. 21 | 1 | 3.3 | 120 |

EXAMPLES 22 TO 25

7.5 g of the non-crosslinked polymer PA of the present invention was dissolved in 92.5 g of the electrolyte solution EA to prepare a solution. Then, to 10 g portions of the solution, 0.75 g of 1,6-hexanediol dimethacrylate, N-methylolmethacrylamide, 3-hydroxyethyl methacrylate or glycidyl acrylate, each serving as a crosslinkable monomer, and 0.01 g of 2,2'-azobis(4-methoxy-2-dimethylvaleronitirle) serving as a polymerization catalyst were added, preparing 4 types of reaction mixtures.

Then, as in Example 1, each of the reaction mixtures was shaped to have a thickness of 300 μm on a TEFLON sheet with a hand coater, and then heated at 70° C. for 90 minutes, preparing a gel film. These gel films were evaluated as in Example 1 in terms of electrochemical properties, thermostability and flexibility. The results are shown in TABLE 4. As can be seen from TABLE 5, all of the 4 types of film gel compositions had a high ion conductivity, and exhibited a good thermostability and a good flexibility.

TABLE 5

|  | Crosslinkable Monomer | Ion Conductivity mS/cm | Thermo-stability | Flexibility |
|---|---|---|---|---|
| Ex. 22 | 1,6-hexanediol dimethacrylate | 2.4 | GOOD | GOOD |
| Ex. 23 | N-methylol-methacrylamide | 2.7 | GOOD | GOOD |
| Ex. 24 | 3-hydroxyethyl methacrylate | 2.1 | GOOD | GOOD |
| Ex. 25 | Glycidyl acrylate | 2.3 | GOOD | GOOD |

EXAMPLES 26 AND 27

7.5 g of the non-crosslinked polymer PA was dissolved in a mixture solution of 91 g of the electrolyte solution EA and 1.5 g of diethylene glycol. Then, to 10 g portions of the mixture solution, 0.5 g of 4,4'-diphenyldiisocyanate or triphenylmethanetriisocyanate, each serving as a crosslinkable monomer, were added to prepare respective solutions. Then, as in Example 1, each of the solutions was shaped to have a thickness of 0.3 mm on a TEFLON sheet with a hand coater, and then heated at 70° C. for 90 minutes, thus preparing a gel film. These two types of gel films were evaluated as in Example 1 in terms of electrochemical properties, thermostability and flexibility. The results are shown in TABLE 6. As can be seen from TABLE 6, all of the 2 types of gel films had a high ion conductivity, and exhibited a good thermostability and a good flexibility.

TABLE 6

|  | Crosslinkable Monomer | Ion Conductivity mS/cm | Thermo-stability | Flexibility |
|---|---|---|---|---|
| Ex. 26 | 4,4'-diphenyldi-isocyanate | 2.0 | GOOD | GOOD |
| Ex. 27 | Triphenylmethane-triisocyanate | 1.8 | GOOD | GOOD |

EXAMPLES 28 AND 30

0.75 g of the same non-crosslinked polymer as that of Example 21 was dissolved in 9.25 g of each of three types of non-aqueous solvents, EC/DEC=1/2 (volume ratio) containing 1 mole/liter of LiPF$_6$ as a supporting electrolyte, EC/DMC=1/2 (volume ratio) and EC/MEC=1/2 (volume ratio), thus preparing three types of polymer solutions. Then, to each polymer solution, 0.5 g of dimethacrylate of polyethylene glycol (n=14) serving as a crosslinkable monomer, and 0.02 g of BDK were added. Using these reaction mixtures, gel films were prepared as in Example 1.

These three types of gel films were evaluated as in Example 1 in terms of electrochemical properties, thermostability and flexibility. The results are shown in TABLE 7. As can be seen from TABLE 7, all of the three types of gel films had a high ion conductivity, and exhibited a good thermostability and a good flexibility.

TABLE 7

|  | Non-aqueous Solvent | Ion Conductivity mS/cm | Thermo-stability | Flexibility |
|---|---|---|---|---|
| Ex. 28 | EC/DEC = 1/2 (volume ratio) | 3.8 | GOOD | GOOD |
| Ex. 29 | EC/DMC = 1/2 (volume ratio) | 4.0 | GOOD | GOOD |
| Ex. 30 | EC/MEC = 1/2 (volume ratio) | 4.3 | GOOD | GOOD |

EXAMPLE 31

75 g of the same non-crosslinked polymer as that of Example 21 was dissolved in 925 g of EC/DEC=1/2 (volume ratio) containing 1 mole/liter of LiPF$_6$ as a supporting electrolyte, and 50 g of the crosslinkable monomer MA was further added. The reaction mixture was coated to a thickness of 100 μm on a sheet of a lithium cobaltate positive electrode material (thickness of 100 μm) that employs an aluminum foil as a current collector, with use of a hand coater. Then, electron beam was irradiated onto the coating for about 1 second with use of an electron beam irradiating apparatus (Model CB250/30/20mA of Iwasaki Electric Co., Ltd.) in a purified nitrogen gas atmosphere at an accelerating voltage of 200 kV, a beam current of 10 mA and a transfer speed of 10 m/minute, thus preparing a gel composition integrated with the positive electrode material (composite). The dosage of electron beam irradiation was 100 kilogray (kGy).

The obtained composite was attached to a lithium metal foil (thickness of 50 μm) in a glove box of an argon atmosphere, and thus a model cell was fabricated. The cell was evaluated in terms of electrochemical properties using the same apparatus as in Example 1. The results indicated that the ion conductivity was 2.5 mS/cm and the bulk resistance was 40 Ω·cm. Thus, it was confirmed that this gel electrolyte composition exhibited an excellent ion conductivity and a stable bulk resistance.

EXAMPLE 32

75 g of the same non-crosslinked polymer as that of Example 21 was dissolved in 925 g of EC/DEC=1/2 (volume ratio) containing 1 mole/liter of $LiPF_6$ as a supporting electrolyte, and 50 g of the crosslinkable monomer MA and 2 g of BDK were further added. The reaction mixture was coated to a thickness of 100 μm on a sheet of a lithium cobaltate positive electrode material (thickness of 100 μm) with an aluminum foil used as a current collector, using a hand coater. Then, ultraviolet ray was irradiated onto the coating as in Example 1, thus preparing a gel composition integrated with the positive electrode material (composite).

The obtained composite was attached to a metallic lithium (thickness of 50 μm) in a glove box of an argon atmosphere to prepare a model cell. The cell was evaluated in terms of electrochemical properties as in Example 31. The results indicated that the ion conductivity was 2.7 mS/cm and the bulk resistance was 37 Ω·cm. Thus, it was confirmed that this gel electrolyte composition exhibited an excellent ion conductivity and a stable bulk resistance.

EXAMPLE 33

A one-terminal ethylated polyethylene glycol (polymerization degree n=9) was reacted for 24 hours at 140° C. with an ethylene/propylene/methacrylic acid ternary copolymer having a molar ratio between ethylene, propylene and methacrylic acid of 50:35:15 and having a weight-average molecular weight of about 50,000, effecting the esterification. Then, the reaction mixture was immersed in ethanol at 30° C. to extract unreacted one-terminal methylated polyethylene glycol. The content of methacrylic acid in the obtained non-crosslinked polymer was 3.5% and the content of the unreacted one-terminal methylated polyethylene glycol was 1.4%.

Thereafter, 8 g of the non-crosslinked polymer was dissolved in 92 g of the electrolyte solution EA, and 8 g of the crosslinkable monomer MA and 0.4 g of BDK were added, thus preparing a reaction mixture.

Using the reaction mixture, a gel film was prepared as in Example 1, and its electrochemical properties (the initial interface resistance and ion conductivity) were evaluated.

The results indicated that the gel film had an ion conductivity of 2.3 mS/cm, and exhibited a good thermostability and a good flexibility.

EXAMPLE 34

<Suppressing Effect on the Dendrite Formation>

A polymer gel film having the same composition as that of Example 21 was prepared, but the thickness of the film was 100 μm. The polymer gel film was sandwiched between two lithium metal foils each having a thickness of 100 μm and a square shape of 3×3 cm. Glass plates having a thickness of 2 mm were placed on both surfaces of the sandwiched film, and fixed with clips, fabricating a cell for evaluation.

On the cell, a constant current electrolysis was carried out at 3 mA/cm² for an hour. Thereafter, the vicinity of the interface between the lithium foil and polymer gel was observed with a CCD camera. It was confirmed that the surface of the lithium foil was smooth and the polymer gel film of this example does not generate a prominent dendrite in the lithium foil interface.

EXAMPLE 35

<Charge/discharge Cycle Properties>

A test cell as shown in FIG. 1 was fabricated, using the same polymer gel composition and the preparation method as in Example 32, with lithium cobaltate coated on an aluminum current collector used a positive electrode and with lithium metal used as a negative electrode. In FIG. 1, reference numeral 11 denotes the negative electrode, and numeral 12 the aluminum current collector coated with lithium cobaltate (not shown). The polymer gel film 13 was interposed between the negative electrode 11 and positive electrode. The negative electrode 11 and aluminum current collector 12 were provided with nickel foils 14 and 15, respectively, which were used to make electrical connection to a charge/discharge property measuring apparatus 16. As the measuring apparatus 16, BS2500 of Keisoku Giken was used. In this example, the thickness of the polymer gel film 13 was 100 μm.

Figure 2A:
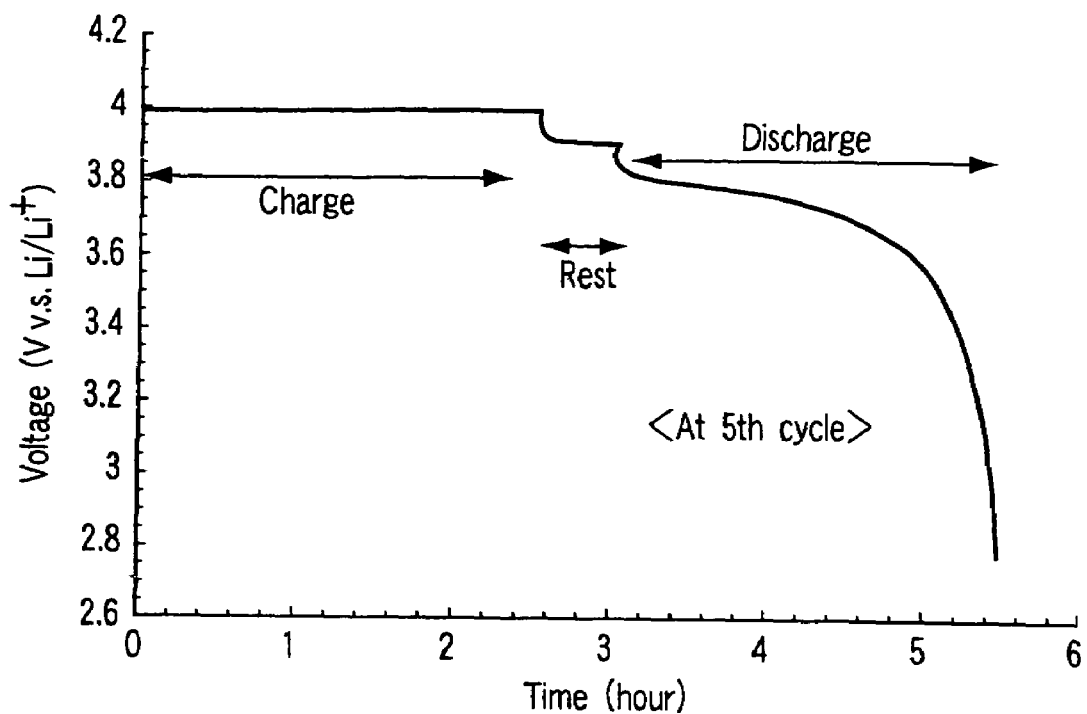
FIGS. 2A and 2B each are a graph showing the charge/discharge properties of the lithium secondary battery, measured in Example 35, which will be described later.
Figure 2B:
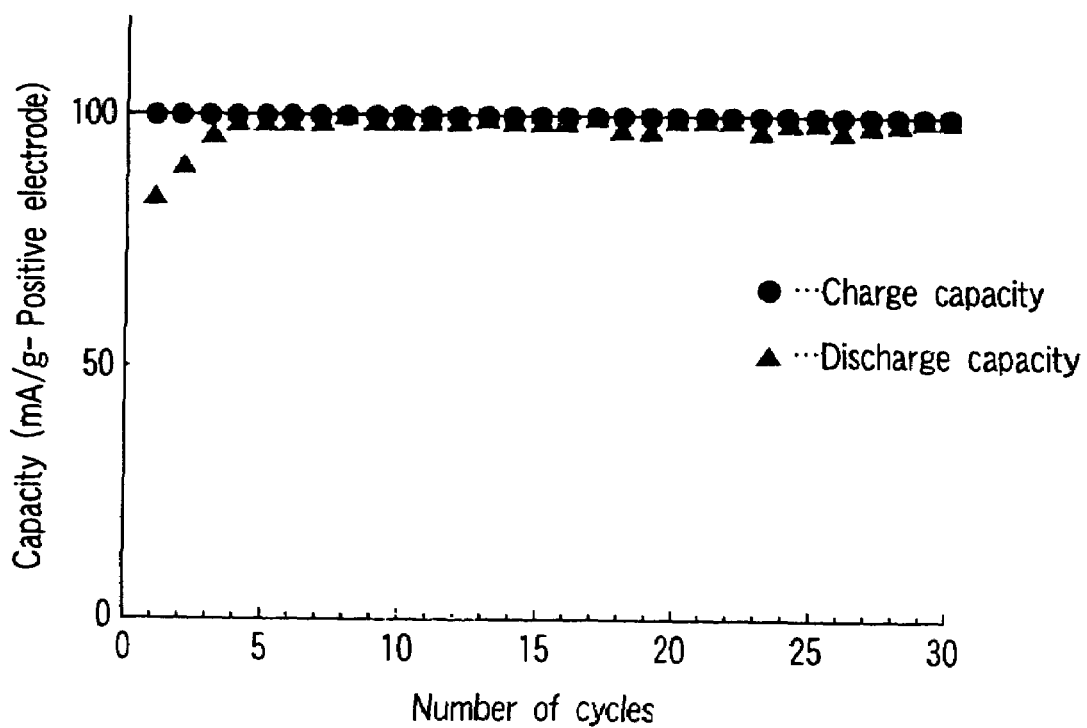

Using this test cell, the charge/discharge cycles were carried out at 20° C., in which the cell was charged in a constant current mode at a current density of 0.25 mA/cm², with the cutoff voltage set at 4.3V, and discharged at the same current density, with the cutoff voltage set at 2.5V. As can be seen in FIG. 2A, which shows the charge/discharge properties at the fifth cycle, a high output voltage of 3.8 to 4.0 was obtained, and further as shown in FIG. 2B, a high Coulomb efficiency of 90% or higher was obtained. Thus, it was found that a lithium secondary battery having a high charge/discharge efficiency, and therefore the polymer gel of the present invention is an excellent electrolyte material for a high-performance lithium secondary battery. Further, this cell could maintain 90% or more of the initial properties even after the charge/discharge was repeated 100 times or more, showing that the gel is a stable polymer gel electrolyte.

EXAMPLE 36

60 g of the same non-crosslinked polymer as that of Example 21 was dissolved in 925 g of a mixture solvent of EC and PC mixed at a volume ratio of 1:2, containing 1 mole/liter of $LiPF_6$ as a supporting electrolyte, and 60 g of the crosslinkable monomer MA and 2.5 g of BDK were further added thereto, thus preparing a reaction mixture. Then, the reaction mixture was impregnated into a polypropylene nonwoven fabric having a thickness of 30 μm and a weight per unit area of 12 g/cm² under a reduced pressure of −50 kPa. The impregnated nonwoven fabric was placed on a sheet of the same positive electrode material as that of Example 32 (thickness of 100 μm), and electron beam was irradiated onto the fabric similarly, thus preparing a gel composition (composite) integrated with the positive electrode material and nonwoven fabric (serving as a separator).

The obtained composite was attached to a lithium metal (having a thickness of 50 μm) as in Example 32, and thus a model cell was fabricate. The cell was evaluated in terms of electrochemical properties as in Example 31. The results indicated that the ion conductivity was 1.5 mS/cm and the bulk resistance was 67 Ω·cm. Thus, it was confirmed that this gel electrolyte composition exhibited an excellent ion conductivity.

EXAMPLE 37

Activated carbon fiber having a specific surface area of 2000 m²/g was applied to a thickness of 250 g/m² on a surface of an aluminum foil, thus forming a charge collecting electrode. On the surface of the charge collecting electrode, a reaction mixture of Example 3 (provided that a propylene carbonate (PC) solution containing 1 mole/liter of tetraethylammonium tetrafluoroborate was used as the electrolyte solution) was applied, and then UV was irradiated similarly to gel the mixture, thus manufacturing a polymer gel film-coated electrode.

Figure 3:
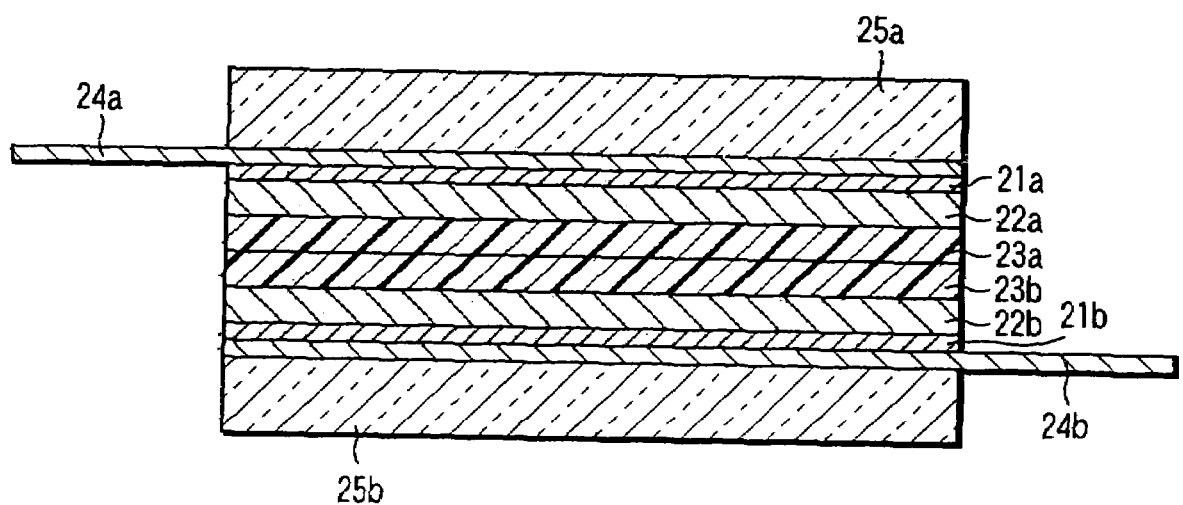
FIG. 3 is a cross sectional view showing a capacitor structure.

The thus obtained gel film-coated electrode was cut into two pieces each having a size of 20×20 mm, and they are attached together so that the gel films were brought into contact with each other. Then, the assembly was interposed between two nickel plates and two glass plates and they are fixed by clips, thus fabricating a test cell as shown in FIG. 3. In FIG. 3, reference numerals 21a and 21b denote the aluminum foils, numerals 22a and 22b denote the activated carbon fiber layers, numerals 23a and 23b denote the polymer gel films, numerals 24a and 24b denote the nickel plates (lead electrodes), and numerals 25a and 25b denote the glass plates.

The cell was measured in terms of the capacitor properties in a constant current charge/discharge operation at a current density of 10 mA/cm² and a cutoff voltage of 2V. The measurement was carried out in a dry box of an argon gas atmosphere at 23° C. The obtained capacity was 0.5 to 0.8 F/cm² and the internal resistance was 1.9 to 3 Ω.

EXAMPLE 38

Figure 4:
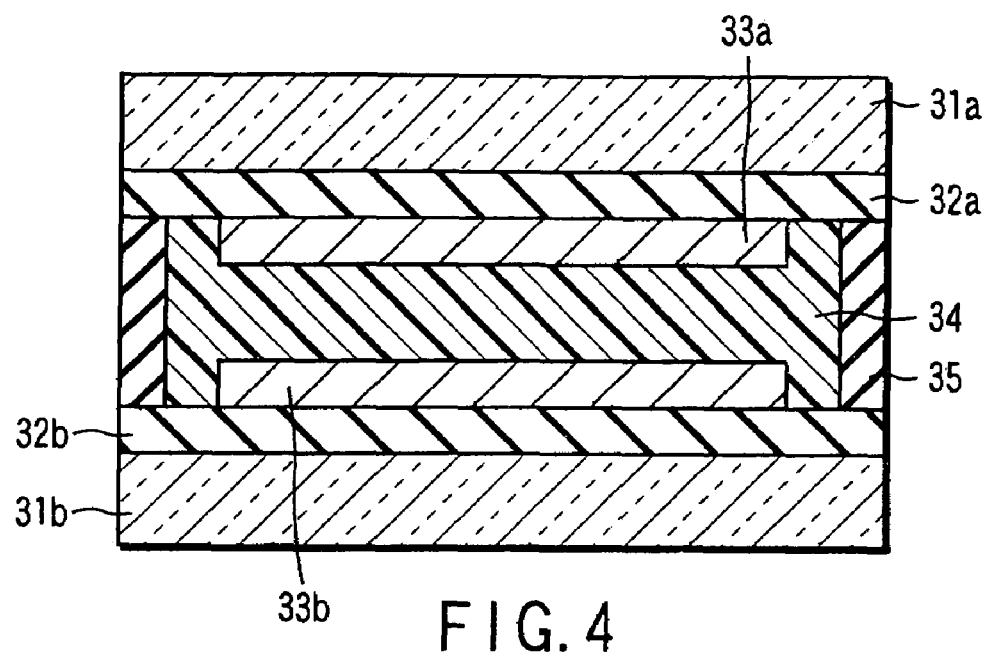
FIG. 4 is a cross sectional view schematically showing an electrochromic device.
Figure 5:
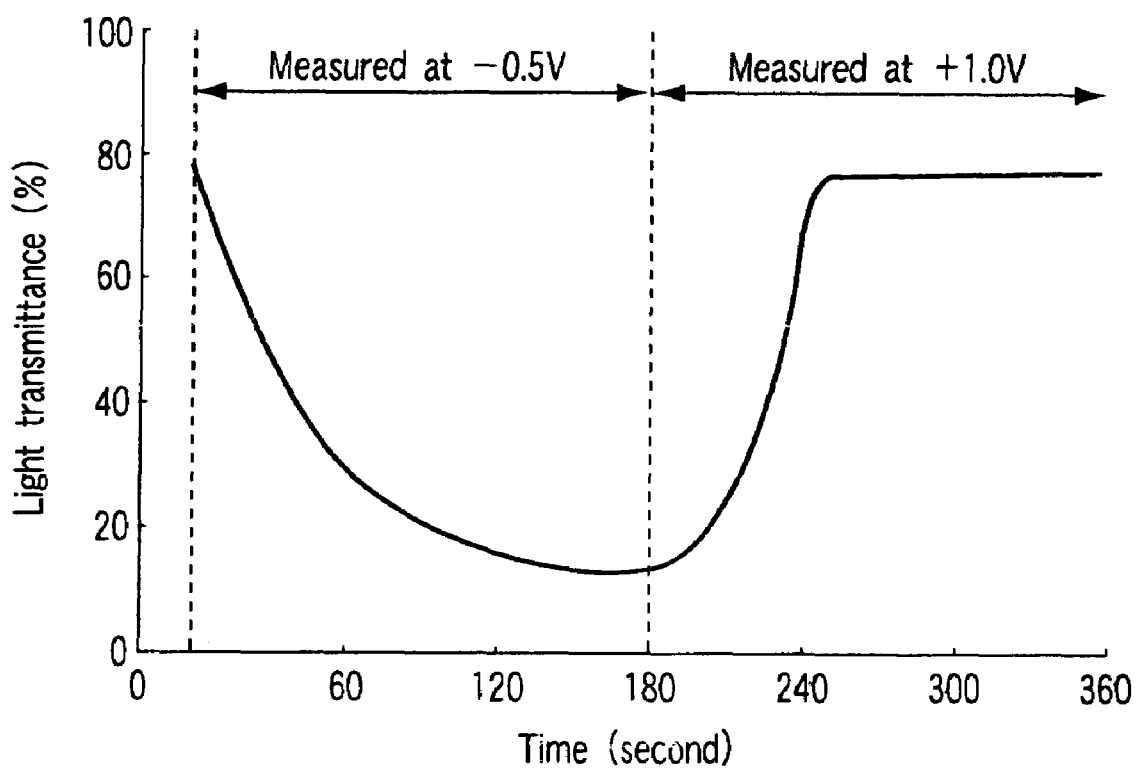
FIG. 5 is a graph showing the light transmitting properties of the electrochromic device, measured in Example 38, which will be described later.

An electrode material that is basically identical to that disclosed in an article reported by a group of Oyama, who is one of the inventors of the present invention, that is, electrodes obtained by coating an indium tin oxide (ITO)-coated light-transmitting electrically conductive glasses (ITO glass) with a tungsten oxide ($WO_3$) thin film having a thickness of 0.4 µm and a Prussian blue (PB) thin film having a thickness of 0.4 µm, respectively, were used as a working electrode and a counter electrode, respectively. Using these electrodes, a cell structure as shown in FIG. 4 was fabricated. This cell was evaluated in terms of the electrochromic display (ECD) properties. In FIG. 4, reference numerals 31a and 31b denote the glass plates, reference numerals 32a and 32b denote the ITO films, reference numerals 33a and 33b denote the $WO_3$ thin film and PB thin film, respectively, reference numeral 34 denotes a polymer gel electrolyte, and reference numeral 35 denotes a spacer. The electrolyte used herein was prepared so as to have a thickness of 100 µm, using the polymer gel electrolyte composition of Example 21 (provided that as the electrolyte solution, a solution prepared by dissolving $LiBF_4$ serving as a supporting electrolyte, so as to have a 1 mole/liter (1 M) concentration, in a mixture solvent of ethylene carbonate and propylene mixed at a volume ratio of 1:1) and the preparation method of Example 21.

The tungsten oxide thin film electrode and PB thin film electrode were independently measured in terms of cyclic voltammogram (CV) using the polymer gel electrolyte of the present invention and an electrolyte solution which does not contain the polymer gel of the present invention, for comparison. The results of the comparison indicated that substantially identical current-potential curves were obtained. Further, during this operation, it was observed that coloring and decoloring occurred due to the oxidization-reduction reactions expressed by the following reaction schemes 1 and 2.

<Reaction Scheme 1>

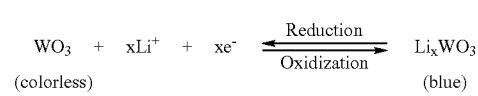

(colorless)                (blue)

<Reaction Scheme 2>

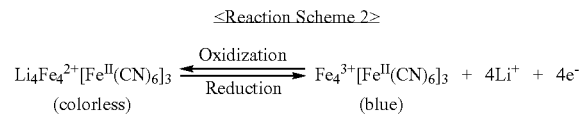

(colorless)                (blue)

Next, the ECD test cell shown in FIG. 4 was examined in terms of the change in light transmitting property at a wavelength of 650 nm when the voltage applied to the tungsten oxide was set to –0.5V and +1.0V. (measured at 20° C.) The response time of the coloring and decoloring was within about 60 seconds, and the reduction of the response property was 10% or less even after 100,000 times or more of repetitions.

From the results obtained above, it can be understood that the polymer gel electrolyte can be used as an electrolyte for a display device based on the principle of ECD, a light-modulating glass and a light-modulating mirror.

EXAMPLE 39

<Ionic Conductivity and Lithium Ion Transport Number>

A one-terminal methylated polyethylene glycol (polymerization degree n=9) was reacted for 24 hours at 140° C. with an ethylene/methacrylic acid copolymer having a molar ratio between ethylene and methacrylic acid of 92:8 and having a weight-average molecular weight of about 80,000, effecting the esterification, to prepare a polymer. Then, the polymer was extracted with ethanol at 30° C. to remove the unreacted one-terminal methylated polyethylene glycol, and was dried. The unreacted acrylic acid in the obtained non-crosslinked polymers was 1.2%, and the remaining one-terminal methylated polyethylene glycol was 0.3%.

3.5 g of the non-crosslinked polymer was dissolved in 91.5 g of the electrolyte solution EA, and 5.0 g of polyethylene glycol (polymerization degree n=4) diacrylate and 0.2 g of BDK were added, thus preparing a reaction mixture. Using the reaction mixture, gel films were prepared as in Example 1.

The gel film was measured in terms of the transport number of lithium ions at 20° C.

The transport number of lithium ions was calculated by the following equation:

$$\text{Transport number} = I^s(dV - I^0 Re^0)/I^0(dV - I^s Re^s)I^0 = dV/(Re^0 + Rb^0)$$

where $I^0$ represents the current value before the constant voltage electrolysis, $I^S$ represents the current value after the constant voltage electrolysis, $Re^0$ represents the interface resistance before the constant voltage electrolysis, $Re^s$ represents the interface resistance after the constant voltage electrolysis, $Rb^0$ represents the bulk resistance before the constant voltage electrolysis, and $dV$ represents the voltage applied during the electrolysis.

The transport number with respect to Li⁺ ions, that was obtained by the analysis using the above-provided equation, was 0.23±0.01. From this value, it was confirmed that the gel electrolyte was a polymer electrolyte that has sufficient properties as an electrolyte.

Next, the ion conductivity of the gel film was measured at various temperatures of $-20°$ C. to $80°$ C., and thus the temperature dependency of the ion conductivity was examined. The results of the measurement are shown in TABLE 8. As is clear from TABLE 8, it was found that the gel film exhibited a value of $1.0 \times 10^{-3}$ S/cm or higher even at $0°$ C., and thus it has an excellent ion conductivity even at a low temperature. Therefore, it can be seen that when this gel electrolyte is used for a lithium secondary battery, the battery can exhibit excellent properties.

TABLE 8

| Ion Conductivity (ms/cm) | | | | | | |
|---|---|---|---|---|---|---|
| $-20°$ C. | $-10°$ C. | $0°$ C. | $20°$ C. | $40°$ C. | $60°$ C. | $80°$ C. |
| 0.59 | 0.85 | 1.13 | 2.10 | 3.43 | 4.99 | 5.46 |

EXAMPLE 40

<Measurement of Potential Window by CV Measurement>

The same reaction mixture solution obtained as that of Example 39 was applied onto a stainless plate (thickness of 100 μm), and UV-ray irradiation was carried out as in Example 1, thus forming a gel film having a thickness of 500 μm. Then, using the same stainless steel as a counter electrode, and a lithium foil (having a thickness of 100 μm) as a reference electrode, a three-electrode electrolytic cell was assembled. The obtained cell was subjected to cyclic voltammetry (CV) at a sweep rate of 1 mV/second from $-0.5V$ to $6.5V$ (versus Li/Li⁺ electrode).

On the oxidation side of the obtained CV curves, a redox peak related to the oxidation of the polymer itself, solvent or the like, was observed at about 4.3 to 4.5V. Therefore, it was found that the anodic side of the potential window of this gel was about 4.3V. On the cathodic side, a reduction related to on the reduction reaction of lithium ions was observed from about 0.0V. Further, the curve was flat in the region of about 0.0 to 4.3V. In other words, it was found that in the potential region of 0.0 to 4.3V, no chemical reaction occurred, and therefore the gel electrolyte obtained in this example had a stable and wide-range potential window.

EXAMPLE 41

Using lithium cobaltate coating (thickness of 88 μm) formed on an aluminum current collector (thickness of 25 μm) as a positive electrode and lithium metal (thickness of 200 μm) as a negative electrode, as well as the same reaction mixture solution as that of Example 39, a gel film having a thickness of 100 μm was prepared as in Example 35. With this gel film, a test cell was fabricated to examine the battery properties using the same method as that of Example 35. The test cell was subjected to a charge/discharge test at $20°$ C., with a voltage set at 2.8V and at 4.3V. The charge/discharge mode employed here was a constant current mode of 0.25 mA/cm². The charge/discharge rate was 0.4 C and the rest time was 30 minutes.

The results of the charge/discharge cycle test indicated that the test cell maintained 92% of the discharge capacity of the initial one even after 100th charge/discharge cycle. Thus, it was verified that the gel electrolyte was stable with respect to a voltage change from 2.8 to 4.3V.

As described above, the polymer gel electrolyte composition of the present invention has, not only a high thermostability of $80°$ C. or more and an excellent ion conductivity of 1 mS/cm or higher, but also a high flexibility. Therefore, when manufacturing a battery, the electrolyte composition can be wound in combination with the positive electrode or negative electrode. Further, it is easy to integrate the gel composition with the positive electrode or negative electrode by gelling it after applied on the surface of the respective electrode. A good adherence between the gel electrolyte and electrode material can be achieved, and the interface resistance with regard to the electrode material becomes stable. Therefore, it is possible with the present invention to easily manufacture electrochemical devices such as a high-performance lithium polymer battery, an electric double layer capacitor, and an electrochromic display device.

What is claimed is:

1. A polymer gel electrolyte composition having a semi-interpenetrating polymer network structure, and comprising a crosslinked polymer network matrix having a three-dimensional crosslinked structure containing a solution of an electrolyte in a non-aqueous solvent, and a non-crosslinked polymer penetrating the crosslinked polymer network gel matrix, the polymer gel electrolyte composition containing 1 part by weight of the crosslinked polymer, 0.1 to 2 parts by weight of the crosslinked polymer network matrix and 3 parts by weight or more of the electrolyte solution, wherein the non-crosslinked polymer is obtained by esterifying a precursor polymer containing (a) an ethylene unit and/or propylene unit and (b) an unsaturated carboxylic acid unit, with a polyalkylene glycol compound having one terminal hydroxyl group protected, conducting the esterification until an amount of unreacted carboxylic acid in the precursor polymer becomes 5% by weight or less, in terms of acrylic acid, and thereafter removing unreacted polyalkylene glycol until a content thereof in the non-crosslinked polymer becomes 10% by weight or less.

2. The composition according to claim 1, wherein the polyalkylene glycol is a polyethylene glycol, a polypropylene glycol or a polyethylene/propylene glycol.

3. The composition according to claim 1, wherein the non-crosslinked polymer further contains an additional copolymerizable monomer unit in an amount of 30% by mole or less.

4. The composition according to claim 1, wherein the non-crosslinked polymer has a weight-average molecular weight of about 2,000 to 800,000.

5. The composition according to claim 1, wherein the non-crosslinked polymer contains the ethylene unit and/or propylene unit in an amount of 50 to 95% by mole.

6. The composition according to claim 1, wherein the crosslinked polymer network matrix is constituted by crosslinkable monomers having two or more reactive functional groups selected from the group consisting of vinyl group, epoxy group, amino group, amide group, imide group, hydroxyl group, methylol group, carboxyl group and isocyanate group.

7. The composition according to claim 1, wherein the electrolyte solution contains the electrolyte in an amount of 0.1 to 3 moles/liter.

8. The composition according to claim 1, wherein the non-aqueous solvent is at least one aprotic solvent selected from the group consisting of a carbonate ester, a lactone, a sulfolane, N-methylpyrrolidone and trimethyl phosphate.

9. An electrochemical device comprising the polymer gel electrolyte composition according to claim 1.

* * * * *